United States Patent [19]
Harpole, Jr. et al.

[11] Patent Number: 5,474,598
[45] Date of Patent: Dec. 12, 1995

[54] MULTI-LINE DRUM FILTER

[75] Inventors: Homer J. Harpole, Jr., Stone Mountain; Martin A. Price, Snellville, both of Ga.

[73] Assignee: Osprey Corporation, Atlanta, Ga.

[21] Appl. No.: 450,544

[22] Filed: May 25, 1995

Related U.S. Application Data

[63] Continuation of Ser. No. 174,798, Dec. 29, 1993, abandoned.

[51] Int. Cl.⁶ ................................................. B01D 33/00
[52] U.S. Cl. ........................... 95/277; 55/290; 55/344; 55/350.1; 55/353; 55/401; 95/278
[58] Field of Search ..................... 55/290, 338, 342, 55/344, 350.1, 353, 354, 400, 401, 431, 467, 483, 484, 500, 472; 95/277, 278; 416/242

[56] References Cited

U.S. PATENT DOCUMENTS

| | | | |
|---|---|---|---|
| 3,472,002 | 10/1969 | Brown et al. | 55/290 |
| 3,667,195 | 6/1972 | Angilly et al. | 55/290 |
| 4,222,754 | 9/1980 | Horvat | 55/290 |
| 4,360,432 | 11/1982 | Kieronski | 55/344 |
| 4,481,021 | 11/1984 | Kinney, Jr. et al. | 55/353 |
| 4,531,890 | 7/1985 | Stokes | 416/242 |
| 4,654,059 | 3/1987 | Matyas | 55/290 |
| 4,689,143 | 8/1987 | Miers | 55/290 |
| 5,181,945 | 1/1993 | Bodovsky | 55/290 |

OTHER PUBLICATIONS

Confirmation by Osprey Corporation's fax number 92/1315, dated Jul. 15, 1992 confirming a request by Mr. Julian Malva of Johnson & Johnson Do Brasil for a "unique application".
JRM facsimile dated Aug. 6, 1992 with reference to "one unit . . . for two machines".
Osprey quotation no. 6303–4 dated Oct. 6, 1992.
Facsimile to Mr. Julio Malva dated Oct. 6, 1992.
Copy of purchase order from Johnson & Johnson Do Brasil dated Oct. 13, 1992.
Copy of Osprey Corporation's job schedule sheet indicating final sale date of Oct. 15, 1992.
Copy of Osprey Corporation's job record sheet no. 2681 dated Oct. 16, 1992.
Copy of Osprey Corporation's job sheet for the job on the Johnson & Johnson Do Brasil project showing the first day of work on the job was billed on Dec. 29, 1992.
Bill of Lading for shipment of Oprey product to Johnson & Johnson.

Primary Examiner—C. Scott Bushey
Attorney, Agent, or Firm—Jones & Askew

[57] ABSTRACT

A rotary drum filter for multiple lines. The filter includes distinct cells for each production line so that fluff or particulate may be recirculated within its own production line. A balancing fan is included which provides static pressure from selected maximum air flow volume to minimum air flow volume for the filter.

14 Claims, 4 Drawing Sheets

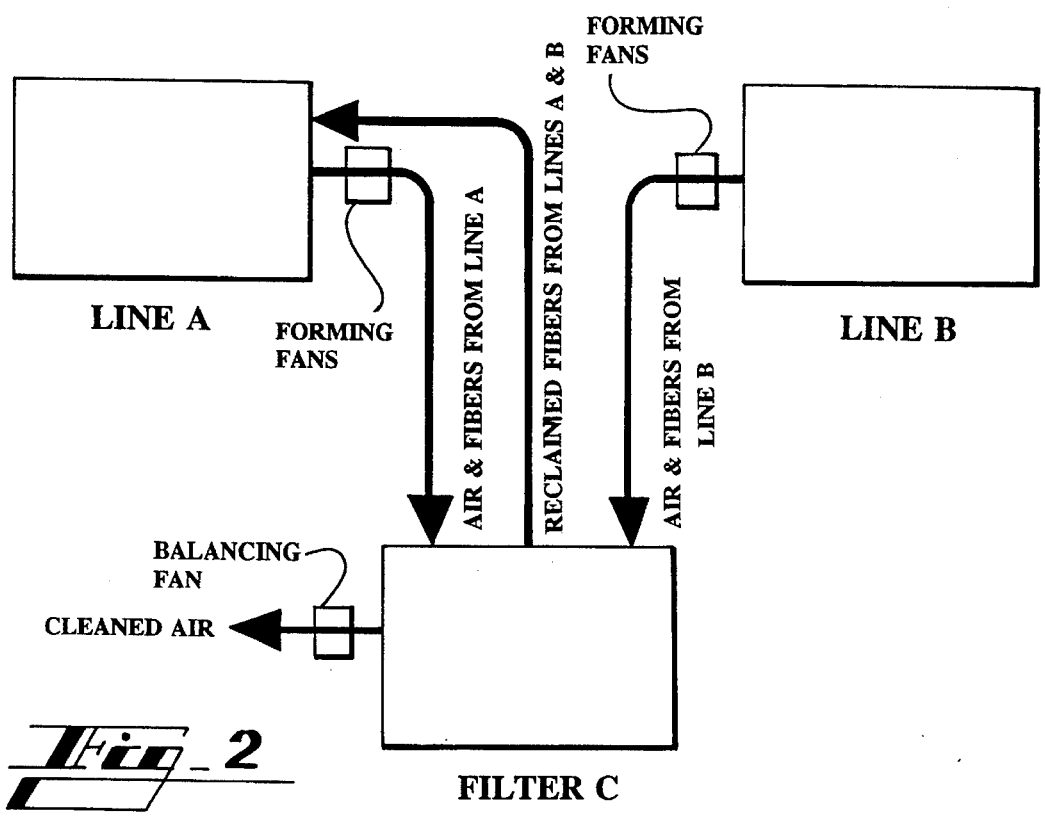
Fig_2
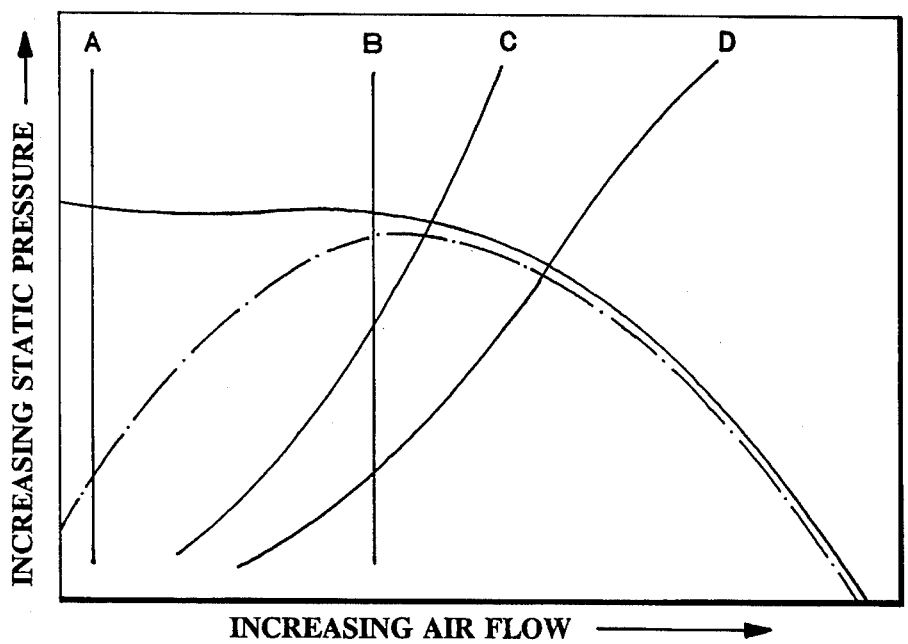
Fig_6

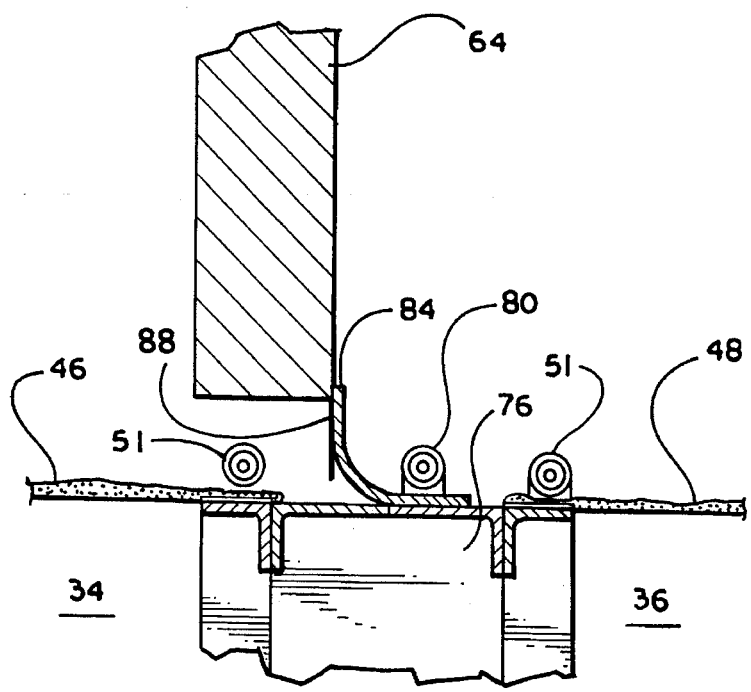
Fig_4
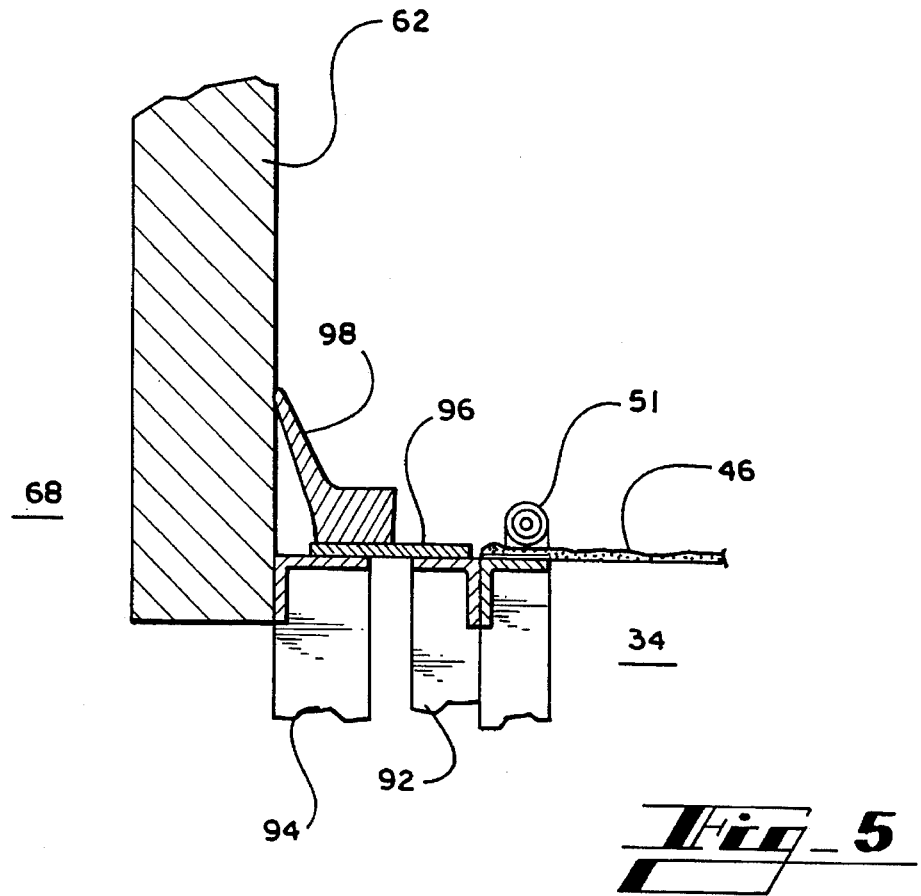
Fig_5

MULTI-LINE DRUM FILTER

This is a continuation of application Ser. No. 08/174,798, filed Dec. 29, 1993, now abandoned.

FIELD OF THE INVENTION

This invention relates in general to a rotary drum filter for a disposable sanitary product line, and more specifically is directed to a rotary drum filter which may be used for a multiple number of such lines.

BACKGROUND OF THE INVENTION

The main absorbent part of most disposable sanitary products is the pad, or core. The pad is often made of wood pulp that has been fiberized by a special mill, designed to handle fluffing pulp. After the pulp is fiberized, it is drawn out of the mill onto a moving air forming screen, which is normally between 40–80 mesh. The pad is formed on the screen in a forming chamber in which the fluffing pulp is placed on the forming screen and is forced into a compact configuration by suction of air through the screen. After the pad is formed on the screen, it moves through a set of profiling rolls and on to the folding and packaging part of the converting machine.

The air that is pulled through the forming screen from the pulp mill contains small amounts of fiberized fluff pulp. Experience has shown that the amount of pulp that comes through the forming screen is 2% or 3% of the total amount of fluff that enters the forming chamber.

Several filters have been developed for filtering the pulp out of the air exiting tile forming chamber. These filters have several advantages. First, the filters clean the air that comes from the forming screen and return the air to the plant area or deposit the air outside of the plant.

Second, the fluff that comes through the forming screen is returned to the mill or forming chamber. The fluff that is returned to the process represents a substantial cost savings to the manufacturer.

For uniform pad formation to take place in the forming chamber, the volume of air moving through the forming chamber and the pressure of that air should be consistent. If the air volume or pressure is changed, the pad will have different thicknesses and absorbencies and will not reach specification. By assisting in moving air through the forming screen a properly-constructed filter can help to assure air volume and pressure consistency through the forming chamber.

One of the filters that is being used for removing the pulp fluff from the air float moves through the forming screen is the rotary drum variety, such as is depicted in FIG. 1. As can be seen in FIG. 1, the process air from the production machine, that is, the air that is moving through the forming screen from the pulp mill, is fed through a conduit 12 into the drum filter enclosure 14. A rotary drum 16, which includes a filter media 18 along its outside, rotates within the drum filter enclosure 14. One end of the rotary drum 16 is closed off, and the other end of the drum opens to a compartment for withdrawing the air. One or more fans are used to move air through the open end of the drum 16 through the media.

As the drum 16 rotates and the clean air is pulled through the media 18, pulp fluff 19 settles on the media. This pulp fluff is vacuumed off through a suction nozzle 20 by a purge fan 22. This fan 22 and other conduit 24 then routes the fluff 19 back to the production line. The clean air which is pulled through the media 18 by the fans of the system is returned to the plant area itself or is exhausted outside the plant.

The utilization of a prior art rotary drum filter, such as is shown in FIG. 1, with a forming chamber helps to create uniform air pressure and volume at the forming chamber. The forming chamber and drum filter utilize at least one fan to create suction at the forming screen. A clean air fan is used at the end of the rotary drum filter for moving the fluff through the media on the drum filter and for creating suction for moving the fluff from the production machine and through the forming screen. In addition, a material handling fan may be used to move the forming air and fluff from the mill through the forming chamber. The material handling fan, also known as a forming fan, would be located on the line extending from the forming chamber to the drum filter.

The drum filter enclosure generally can only handle approximately 12 inches water column (wc) of negative pressure. The material handling fan must be used if the forming chamber requires more than 8 inches wc of negative pressure. If a material handling fan is used in the forming chamber, then the fan at the rear end of the drum filter, or the clean air fan, is used as a balancing fan to keep the filter under a negative pressure. Because increasing forming chamber pressure is a common requirement of sanitary products machine manufacturers, material handling fans are often used to generate the required high pressures and volumes in a system. In such systems, the clean air fan located at the end of the rotary drum filter serves mainly as a balancing fan to keep the filter under negative pressure.

Prior art processes utilize one drum filter for one production line. The drum filters are expensive and take up a large amount of floor space in a plant. There is a need for a rotary drum filter system which is capable of use for more than one line.

Simply running two production lines into a drum filter to handle twice as much fluff has not been found to be an adequate solution to the problem. By running two production lines to one rotary drum filter, uniform air volume and pressure will not be maintained if either of the connected production lines cease to operate. This problem is best explained by reference to FIG. 2 and the description in the following paragraphs.

The system set forth in FIG. 2 discloses a first line A having a first forming chamber, a second line B having a second forming chamber, and a drum filter C. Forming fans are located on both forming chambers to provide necessary air volume and static pressure for pad formation and so as to deliver the forming air and small amounts of fluff to drum filter C. The filter C includes a balancing fan which serves to keep the system under negative pressure. The fluff that is returned from the drum filter is sent back to the forming chamber A.

If both forming chambers in the drum filter are in operation, the system operation works fine. Also, if line A stops running for a few minutes, the filter C can go into a recirculation mode, and fluff from A and B will be recirculated into the filter C. Under this condition, the entire system should run fine for a short period.

If line A stops for a long period of time, such as one hour or more, and the forming fan for that line is stopped to keep from wasting electricity, the air volume to the filter C is dramatically affected. This causes a series of problems. First, the forming fan on line B is putting fluff into the filter C, but the fluff is not going out of the filter C because fluff is set up to return to line A, which is no longer running and, therefore, cannot use the fluff. The reclaim fluff cannot be put into line B because it is not set up to take the reclaim. Rerouting the fluff to line B takes time and an unnecessary shutdown of line B, in addition to the already shutdown line A. Furthermore, moving the reclaim fluff to line B would also take an adjustment in the forming chamber of line B for the additional fluff which is entering the chamber.

If, on the other hand, line B stops for a few minutes, fluff no longer goes from line B to the drum filter, cutting the amount of fluff that is going to line A from the filter in half. This reduction affects the pad weight; therefore, the product is no longer within specification.

Another problem exists with these shutdowns. With either the forming fan on line A or the forming fan on line B out of operation, the air volume is reduced to the balancing fan of the system. In most cases, this reduction means that the balancing fan is not getting enough air for its speed, causing the fan to become unstable. Instability will cause the fan to vibrate and shakes the filter enclosure and connecting duct. Such vibration may result in mechanical failure of the balancing fan and/or damage to the drum filter.

There is a need in the art for a rotary drum system which can be used for more than one fluff forming line and which can continue that use after one of the lines is shut down for a short or long period of time. Preferably, such a system would handle reclaimed fluff widen a product line stops operation and would be able to handle the change in air volume and static pressure to the balancing fan when forming air from one production line no longer goes to the drum filter.

SUMMARY OF THE INVENTION

The present invention overcomes the foregoing problems by means of a multi-chambered drum filter. The system provides a drum filter with distinct cells for each production line or forming chambers. Each line has its own separation wall, its own duct connection to the production line, and its own purge fan system for returning fluff back to the forming chamber or to the mill. Consequently, when a particular production line is shut down, the amount of fluff recirculated to the other production lines is not affected. The fluff from one forming chamber does not come into contact with the fluff from the other forming chambers. By dividing the drum filter into independent cells of filtration, a single enclosure and drum filter may be used for several lines. The drum sections and cells all have a common shaft, drive, enclosure, and balancing fan, saving space and costs over the use of individual filters for each line.

To keep the balancing fan on this multi-line drum filter system from reaching an unstable point of operation when one of the forming chambers is shut down, a fan having a backwardly-inclined air foil bladed wheel and special housing is used. This special fan can provide stable static pressure performance over the entire range of air flows that the balancing fan may encounter as the multiple forming lines are started and stopped during a production schedule.

More specifically stated, the present invention provides a filter for separating a particulate from conveyed air. The filter includes an enclosure and a rotary drum contained within the enclosure. The filter media is attached on the outer surface of the drum and at least one plenum wall is included in the enclosure for separating the enclosure pinto compartments. At least part of the rotary drum extends into each of the compartments. Conduit means are provided for each compartment for depositing a particulate and air mixture into the compartments at an air flow volume, Preferably, the fan is capable of drawing the air out of the enclosure at a substantially constant static pressure from approximately the lowest air flow volume of the conduit to an air flow which is approximately the sum of the air flow volumes of the conduits combined.

Therefore, it is an object of the present invention to provide an improved filter.

It is another object of the present invention to provide a rotary drum system which is capable of use for more than one fluff pad forming line.

It is still another object of the present invention to provide a rotary drum system which is capable of use for more than one fluff pad forming line and which can continue that use after one of the lines is shut down for a short or long period of time.

Another object of the present invention is to provide a rotary drum system which is capable of use for more than one fluff pad forming line and which can handle reclaimed fluff when one of the product lines stops operation.

Yet another object of the present invention is to provide a rotary drum system which is capable of use for more than one fluff pad forming line and which is able to handle the change in air volume and static pressure to the balancing fan when the forming air from one product line no longer goes to the drum filter.

Other objects, features, and advantages will become apparent upon consideration of the following detailed description of the invention when taken in conjunction with the drawing and the appended claims.

DESCRIPTION OF THE DRAWINGS

FIG. 2 is a schematic diagram of a multi-line filtration system which is used as a hypothetical example to describe possible problems which may occur when trying to combine two lines and one drum filter.

FIG. 4 is a cut-away perspective view, taken along the cut-away lines 4—4 of FIG. 3, of the sealing system for the secondary plenum walls around the rotary drum of FIG. 3.

FIG. 5 is a cut-away perspective view, taken along the cut-away lines 5—5 of FIG. 3, of the sealing system for the primary plenum wall around the rotary drum of FIG. 3.

FIG. 6 is a line graph displaying static pressure versus air flow for a conventional fan and a backwardly-inclined air foil fan.

DETAILED DESCRIPTION OF THE PREFERRED EMBODIMENT

Figure 1:
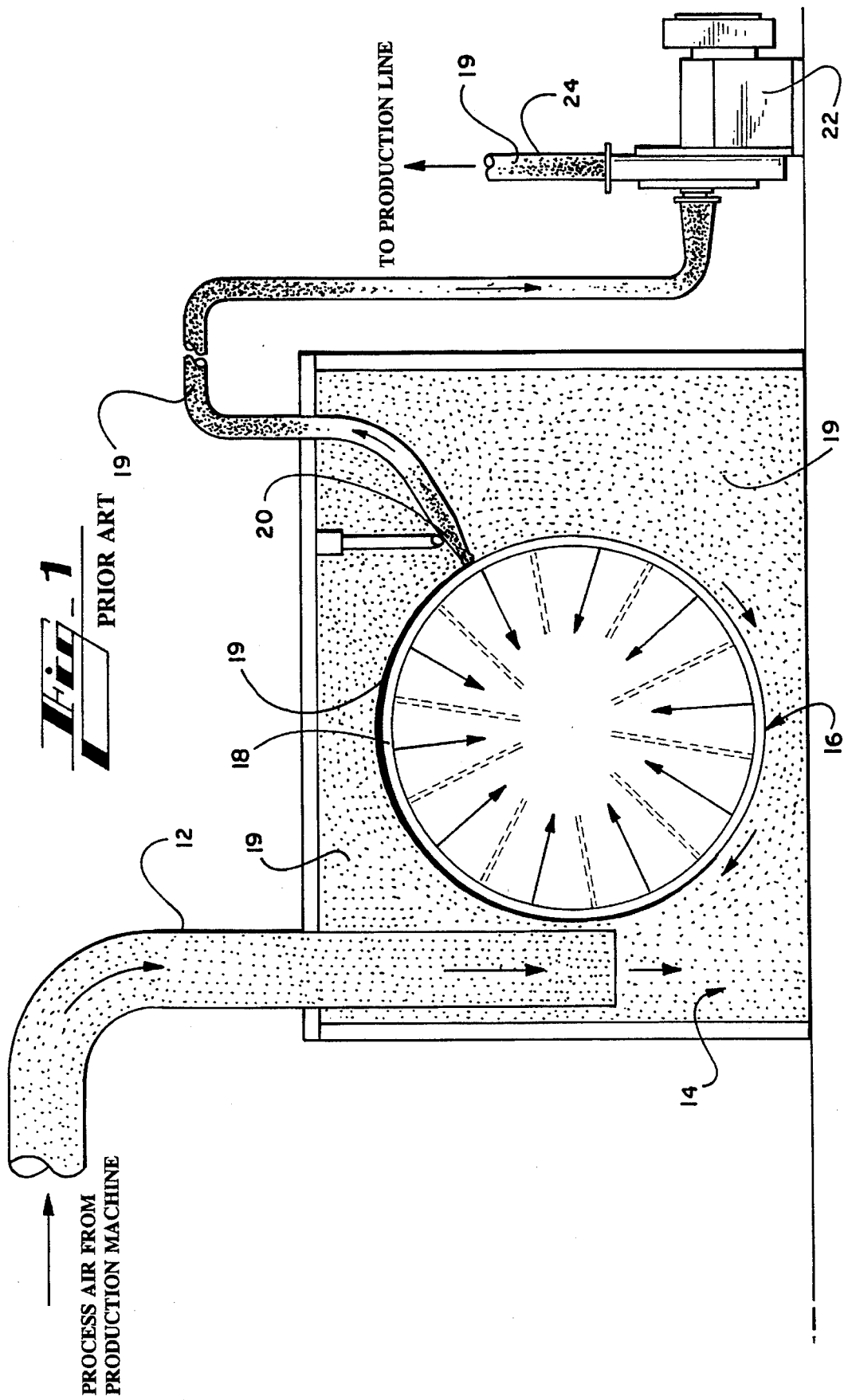
FIG. 1 is a side view of a prior art rotary drum filter.
Figure 3:
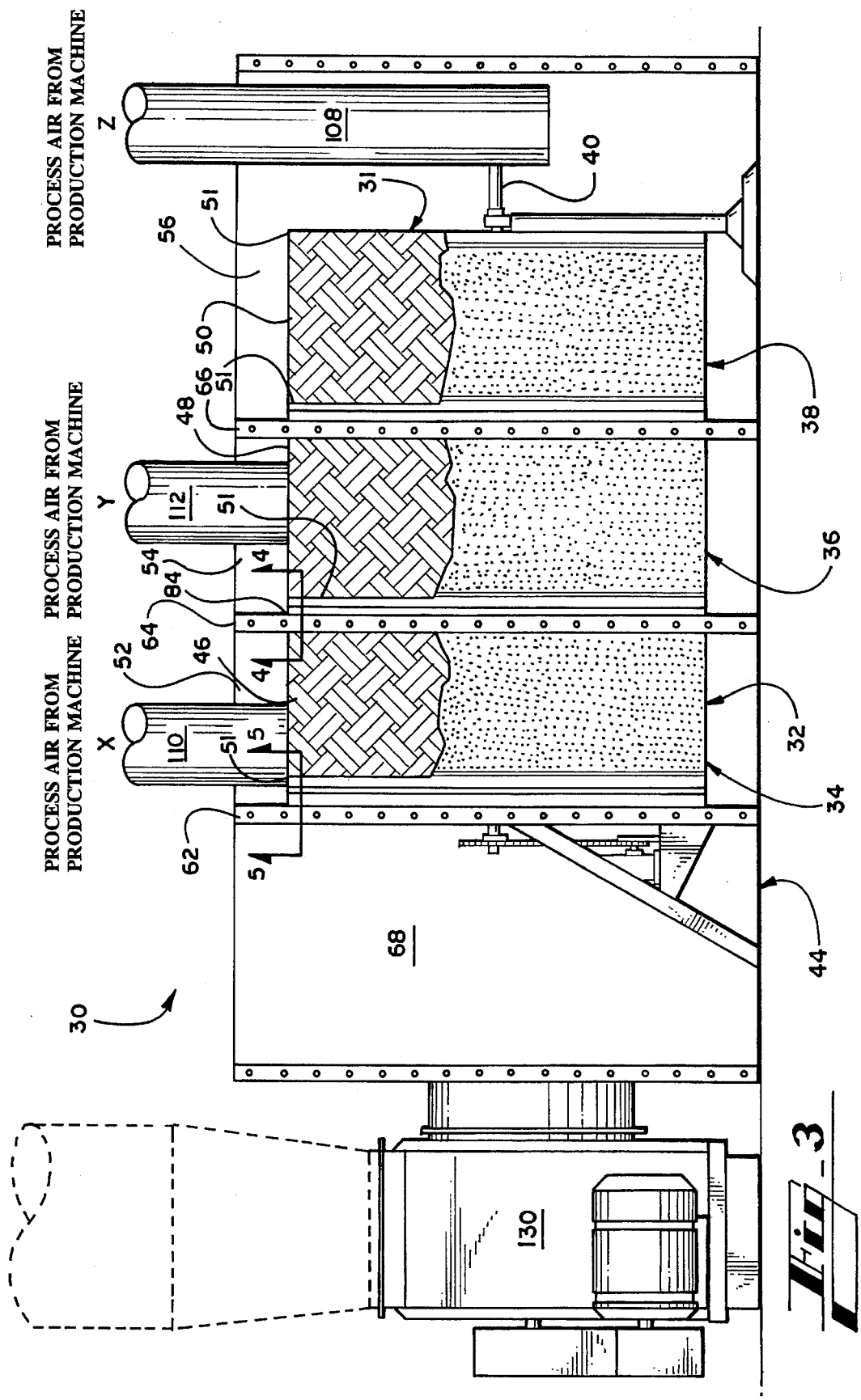
FIG. 3 is a partial cutaway view of a rotary drum filter embodying the present invention.

Referring now to the drawing, in which like numerals represent like parts throughout the several views, FIG. 3 discloses a multi-chamber rotary drum filter 30 embodying the present invention. The drum filter 30 includes a rotary drum 32. The rotary drum 32 shown in FIG. 3 is closed at the rear end 31 of the filter 30 (the right side of FIG. 3) and is open at the front side 33 of the filter (to the left in FIG. 3).

In the embodiment shown in FIG. 3, the rotary drum 32 has three separate drum cages 34, 36, and 38. While the preferred embodiment above is described with reference to three drum cages, it is to be understood that a reasonable number of drum cages may be used in this multi-line drum filter. Moreover, any type of filter system having media which comes into contact with a stream of particulate can be used, including but not limited to, rotary disk filters and rotating line filters. The three cages 34, 36, and 38 are formed by separation of the rotary drum 32 and therefore share a common shaft 40, drive 42, and enclosure 44. Each of the drum cages 34, 36, 38 includes a perforated metal outer surface onto which is attached a filtering media 46, 48, 50. The media is held in place by media holding bands 51, as can best be seen in FIGS. 4 and 5. The media 46, 48, and 50 are shown in FIG. 3 as covering only part of the drum 32 so that the construction of the drum can be more easily understood. However, it is to be understood that the media 46, 48, and 50 extends all the way around each of the drum cages 34, 36, and 38.

Each of the drum cages 34, 36, and 38 is contained in a separate cell or compartment 52, 54, 56. The three compartments 52, 54, 56 are separated by plenum walls 62, 64, and 66. The plenum walls 62, 64, 66 extend to and abut the outer surfaces of the rotary drum 32, separating the continuous rotary drum into the drum cages 34, 36, 38. However, there is no separation between the inner portions of the drum cages 34, 36, 38.

The first plenum wall 62 is the primary, or main plenum wall and separates the "dirty air side" of the enclosure 44 (the right side in FIG. 3) from the "clean air side" (the left side in FIG. 3) of the enclosure 44. The clean air side of the enclosure constitutes a chamber 68 which communicates with the open side of the drum 32. The second and third plenum walls 64, 66 are "secondary plenum walls" and separate the outer portion of drum cages 34, 36, 38.

The seal between the drum cages 34, 36, 38 and the plenum walls 62, 64, 66 is best shown in FIGS. 4 and 5. The drawing in FIG. 4 represents the seal between the secondary plenum wall 64 and the rotary drum 32, which is identical to the seal between the other secondary plenum wall 66 and the rotary drum. Thus, the description with relation to FIG. 4 and the secondary plenum wall 64 also applies to the secondary plenum wall 66. As can be seen by FIG. 4, the middle drum cage 36 includes a drum cage spacer ring 76. This ring 76 is simply an outward flange which extends from the front portion of the outer diameter of the middle cage 36. The spacer ring 76 extends to and is attached to the front cage 34, forming the continuous rotary drum 32. Mounted on the spacer ring 76 is a seal holding band 80 for holding in place a felt section seal 84. The felt section seal 84 extends around the outer diameter of the cage and bends outwardly to engage an annular plate 88 on the secondary plenum wall 64. The felt section seal 84 rotates with the drum 32, while maintaining contact with the annular plate 88, forming a continuous seal between the front and middle cages 34, 36. As a result, the seal 84 and the secondary plenum wall 64 serve to separate the compartments 52 and 54 from one another.

The seal between the front drum cage 34 and the primary plenum wall 62 is depicted in FIG. 5. As can be seen in FIG. 5, the front drum cage 34 includes a drum cage spacer ring 92. A stationary ring 94 extends outwardly from the primary plenum wall 62 and is even with the end of the drum cage spacer ring 92. A primary seal 96 extends from the drum cage spacer ring 92 across the top of the stationary ring 94. A secondary seal 98 rests on top of the primary seal 96 and engages the main plenum wall 62. These two seals 96, 98 rotate with the rotary drum 32 and together prevent fluff from entering the clean air chamber 68.

The plenum walls 62, 64, 66 separate the enclosure 44 into four separate compartments 68, 52, 54, 56. As stated earlier, the chamber 68 constitutes the clean air side of the enclosure 44. Each of the other compartments 52, 54, 56 represent distinct cells for separate production lines represented in the drawing by X, Y, and Z. For example, the compartment 56 has its own input process air from a production machine or forming chamber from line Z through a duct 108. In addition, the compartment 56 includes a suction nozzle (not shown) for vacuuming off material from the media 50 in that cell. This material may then return through a purge fan (not shown) back to the production line Z. Likewise, each of the other compartments 52, 54 includes input conduit 110, 112 from the lines X and Y, respectively, and suction nozzles (not shown) for removing fluff from the media 46, 48 and returning it to those lines.

As can be seen by the above description, the separation of the compartments 52, 54, and 56 provides each of the lines X, Y, Z with its own independent cell of filtration. Because the lines are separately sealed off, fluff for each line X, Y, Z may be recirculated within its own production line filter cell, and none of the other production lines are affected by the others. The fluff from one forming chamber does not come into contact with fluff from other forming chambers.

As shown in FIG. 3, a balancing fan 130 is attached to the clean air chamber 68 for moving air through the filter media 46, 48, 50 on each of the drum cages 34, 36, and 38. To provide the preferred operation of the drum filter 30, the balancing fan 130 should be capable of providing relatively constant static pressure over a large variance in air flow. Applicants have discovered that by using a fan with a backwardly-inclined airfoil bladed wheel and special housing ("backwardly inclined airfoil fan"), such as designed by the American Fan Company in Fairfield, Ohio, that such specifications can be met. This special fan can provide stable static pressure performance over the entire range of air flows that the balancing fan may experience. Unlike conventional fans, the backwardly-inclined airfoil fans exhibit an essentially constant static pressure over a large variance of air flow volumes.

FIG. 6 displays static pressure versus air flow curves at constant revolutions per minute (rpm), for a conventional fan and a backwardly inclined airfoil fan. The graphs are call "Constant Speed Performance Curves" and are standard in the industry. The graph presented in FIG. 6 is not an exact numeric representation of the performance of the two fans, but serve as a generalization of the behavior of the two types of fans. As can be seen in the drawing, conventional fans exhibit a reduction in static pressure from a corresponding reduction in air flow at the lower end of the air flow ranges, particularly in the air flow range between lines A and B. In contrast, the backwardly inclined airfoil fan maintains relatively constant static pressure over this same A to B air flow range.

Manufacturers of the fans represent that the peak static efficiency is along the line D and suggest not selecting levels of service to the left of line C in the graph. However, applicants have discovered that by oversizing their balancing fans such that regular use of the fan (that is, all lines in operation) lies somewhere near or to the left of line C, optimum results can be achieved. This is because once one or two lines have dropped out of use and the filter continues to run, the air flow to the balancing fan is reduced and operation of the balancing fan falls back between the lines A and B on the graph. Because the backwardly inclined airfoil fan exhibits a relatively constant static pressure over this portion of the curve, the fan will still operate smoothly in this area. However, if a conventional fan is used, a drop in static pressure occurs when one or more lines drop from service. This reduction of air flow through the balancing fan causes the fan to become unstable and to vibrate. These vibrations shake the filter enclosure and the connecting conduit and may cause the fan to break apart and/or move the enclosure.

Therefore, for optimal operation of the filter 30 of the present invention, the balancing fan 130 must exhibit relatively constant static pressure from the maximum air flow of the system to the minimum air flow of the system. This means selecting an air foil fan that is large enough to sustain consistent performance from selected maximum air flow volume (the air flow volume which occurs when all lines are operating) to minimum air flow volume (the air flow volume when the line with the lowest air flow volume is the only one operating).

A hypothetical example is described as follows. A first line having a forming fan D, moving 4,000 cubic feet of air per minute (cfm) at −10 inches wc and a second line having a forming fan E, moving 5,000 cfm at −14 inches wc are each attached to a drum filter enclosure such as is described above. A balancing fan F on the drum filter is operating with 9,000 cfm at −8 inches wc pressure differential across the fan. If the first line and forming fan D stop and the damper closes to keep air from being pulled through the forming chamber of the first line, then the balancing the fan F on the drum filter will drop to 5,000 cfm. If a backwardly-inclined airfoil fan or a fan exhibiting no change in static pressure from a drop in air flow is used for the fan F, the fan will maintain approximately −8 inches we. During the system change, the forming fan E on the second line will not change in either volume or static pressure and therefore the forming chamber of the second line will not be effected by the shutdown of the first line. The balancing fan will not be affected by stopping operation on the first line.

As can be understood from the foregoing, the present invention offers benefits not afforded by prior art. By using an independent filtration cell for each production line and connecting the air through each cell with the properly selected backwardly-inclined airfoil fan, reliable fluff return may be supplied to each production line, while maintaining constant pressure and volume at each of the forming chambers. Moreover, the system supplies first quality air filtration while the drum filter is serving more than one sanitary products production line, and can continue this filtration when one of the lines is down.

While this invention has been described in detail with particular reference to preferred embodiments thereof, it will be understood that variations and modifications can be affected within the spirit and scope of the invention as described hereinbefore and as defined in the appended claims.

What is claimed is:

1. A method for separating particulate from conveying air, comprising the steps of:
   depositing a first particulate and air mixture into a compartment of an enclosure at a first air flow, depositing a second particulate and air mixture into the compartment of the enclosure at a second air flow, the enclosure comprising:
   a filter media within the enclosure which divides the enclosure into a chamber and the compartment; and
   a fan attached to the chamber for drawing the air in the mixtures from the compartment, through the filter media, into the chamber; and
   drawing the air from the compartment, through the filter media, into the chamber by using the fan, the fan capable of drawing the air at a substantially constant static pressure without additional air input from approximately the first air flow to an air flow which is approximately the sum of the first air flow and the second air flow.

2. The method of claim 1, further comprising the steps of:
   reducing or stopping the deposit of the second particulate and air mixture; and
   continuing to draw air from the compartment, through the filter media, into the chamber without additional air input.

3. The method of claim 2, wherein the deposit of the second particulate and air mixture is substantially stopped, and the fan draws the air at the substantially constant static pressure at approximately the first air flow rate.

4. A filter for separating a particulate from conveying air, the filter comprising:
   a. an enclosure;
   b. a rotary drum contained within the enclosure;
   c. falter media attached on the outer surface of the drum;
   d. a plenum wall for separating the enclosure into first and second compartments, at least part of the rotary drum extending into each of the compartments;
   e. first and second conduit means, the first conduit means for depositing a particulate and air mixture into the first compartment at a first air flow volume, the second conduit means for depositing a particulate and air mixture into the second compartment at a second air flow volume; and
   f. a fan for drawing the air in the mixtures from the first and second compartments through the filter media on the rotary drum and out of the enclosure, the fan capable of exhibiting a substantially constant static pressure without additional air input from approximately the first air flow volume to approximately the sum of the first and second flow volumes.

5. The filter of claim 4, further comprising:
   a second plenum wall defining a third compartment, at least part of the rotary drum extending into the third compartment; and
   third conduit means for depositing a particulate and air mixture into the third compartment.

6. The filter of claim 4, further comprising first means for removing the particulate from the filter media on the portion of the rotary drum within the first compartment.

7. The filter of claim 6, further comprising second means for removing the particulate from the filter media on the portion of the rotary drum within the second compartment.

8. A filter for separating particulate from conveying air, the filter comprising:
   a. an enclosure;
   b. a filter media within the enclosure which divides the enclosure into a chamber and a compartment;
   c. means for depositing a first particulate and air mixture into the compartment of the enclosure at a first air flow;
   d. means for depositing a second particulate and air mixture into the compartment of the enclosure at a second air flow; and
   e. a fan attached to the chamber for drawing the air in the mixtures from the compartment, through the filter media, into the chamber, the fan capable of drawing the air at a substantially constant static pressure without additional air input from approximately the first air flow to an air flow which is approximately the sum of the first air flow and the second air flow.

9. The filter of claim 8, further comprising a plenum wall for separating the compartment into first and second portions, at least part of the filter media extending into each of the portions, the means for depositing the first mixture depositing the mixture into the first portion and the means for depositing the second mixture depositing the mixture into the second portion.

10. The filter of claim 8, wherein the filter media is on a rotary drum and the inside of the rotary drum forms the chamber and the outside of the rotary drum forms the compartment.

11. The filter of claim 8, wherein the fan is a backwardly-inclined airfoil fan.

12. A filter for separating a particulate from conveying air, the filter comprising:
  a. an enclosure;
  b. a rotary drum contained within the enclosure;
  c. filter media attached on the outer radius of the drum;
  d. at least one plenum wall for separating the enclosure into two or more compartments, at least part of the rotary drum extending into each of the compartments;
  e. each of the compartments having respective conduit means for depositing a particulate and air mixture into the respective compartments at respective air flow volumes; and
  f. a fan for drawing the air in the mixtures from the compartments through the filter media on the rotary drum and out of the enclosure, the fan capable of exhibiting a substantially constant static pressure without additional air input from approximately the lowest respective air flow volume of all the conduit means to approximately the sum of all the respective flow volumes of all the conduit means.

13. The filter of claim 4, wherein the second air flow volume is greater than or equal to the first air flow volume.

14. The filter of claim 8, wherein the second air flow is greater than or equal to the first air flow.

* * * * *